Oct. 7, 1958  E. A. MOORE  2,855,509
VARIABLE DELAY TIME PULSE GENERATOR
Filed April 20, 1954  2 Sheets-Sheet 1
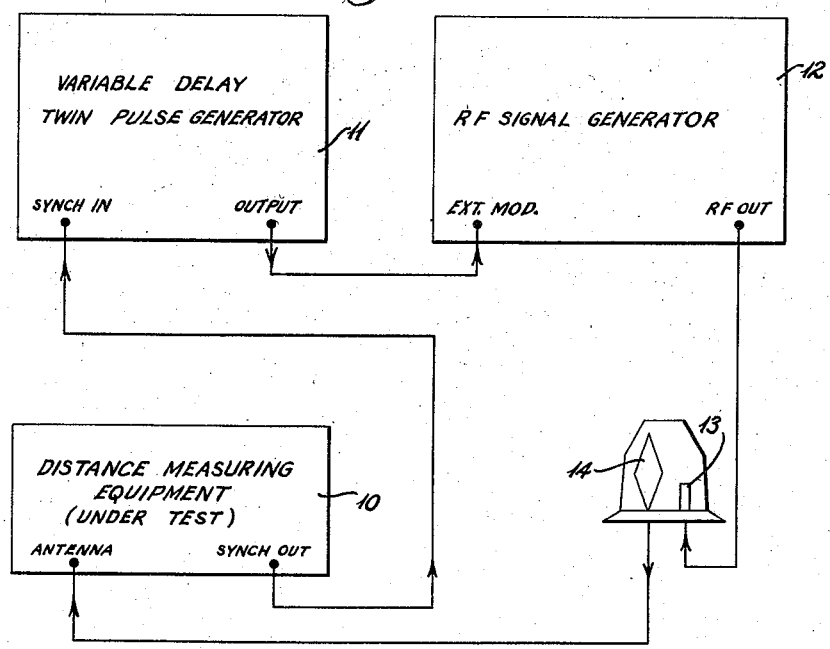
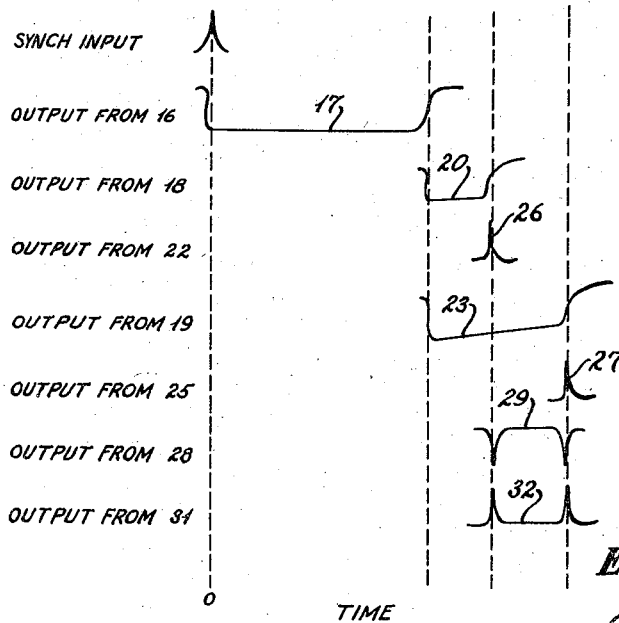
INVENTOR
Edward A. Moore
BY
ATTORNEYS

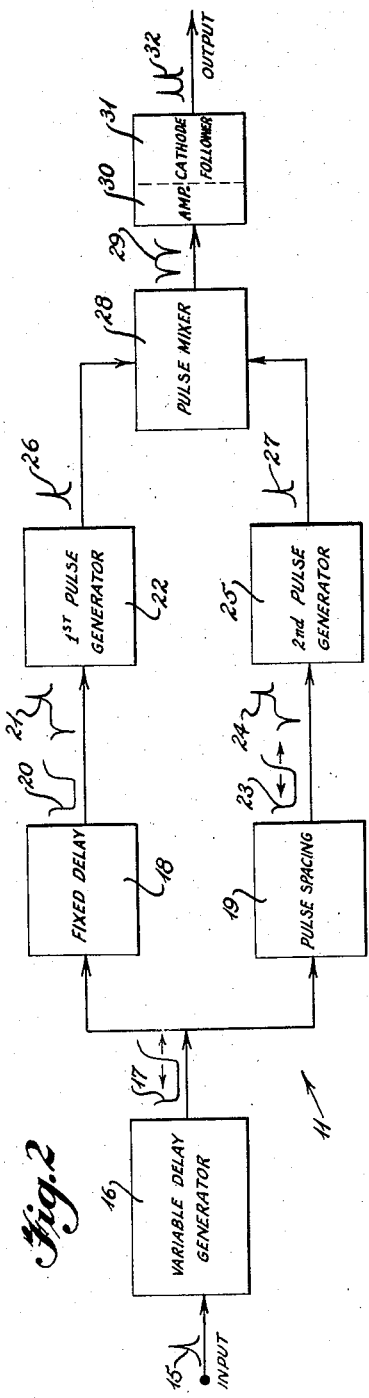
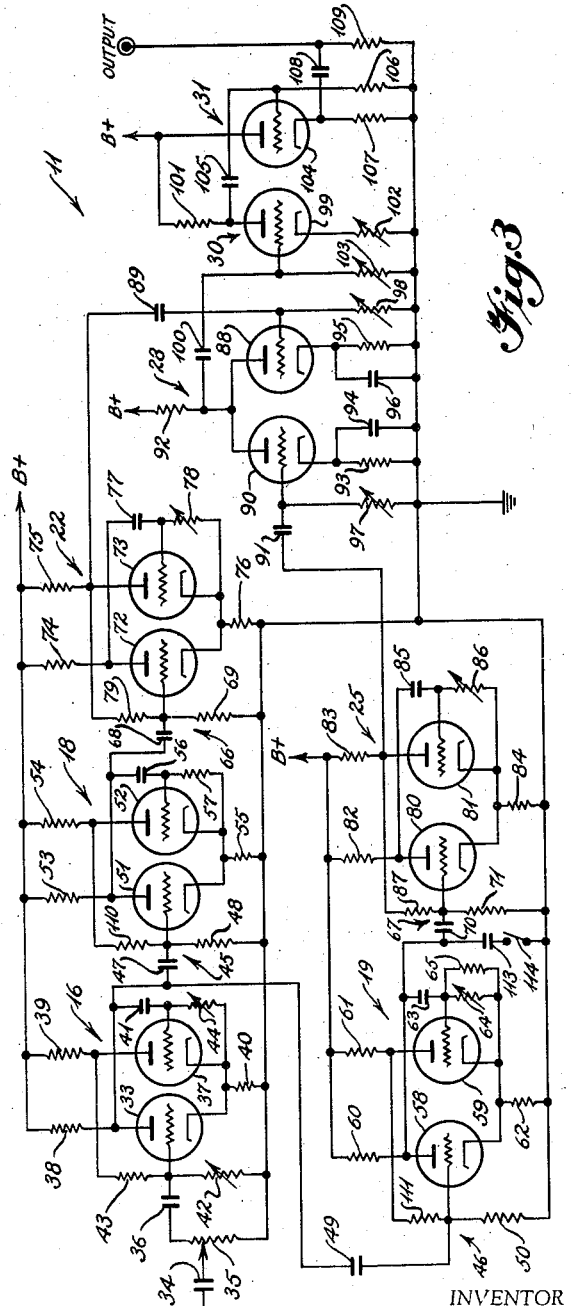

United States Patent Office 2,855,509
Patented Oct. 7, 1958

2,855,509

VARIABLE DELAY TIME PULSE GENERATOR

Edward A. Moore, Beaver Falls, Pa.

Application April 20, 1954, Serial No. 424,527

4 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for generating a pair of pulses which are variable in amplitude, width, spacing, and in time of occurrence from a trigger pulse. More specifically, this invention relates to a variable delay twin pulse generator for use in testing distance measuring equipment.

Distance measuring equipment (hereinafter referred to as D. M. E.) is a pulse type of radio navigation apparatus which is used for continuously measuring slant range from an aircraft in flight to a predetermined ground station which is within line-of-sight distance from the aircraft. In the operation of D. M. E., an airborne interrogator transmits a pair of pulses, having a predetermined spacing, which are received by a ground station. These pulses are transmitted on a carrier wave having a predetermined frequency. The first transmitted pulse energizes the ground station and the second pulse triggers the ground station. The ground station, after being triggered, transmits a pair of pulses, having a predetermined spacing, to the aircraft. This pair of pulses is transmitted on a carrier wave having a frequency which is different from that of the airborne interrogator unit transmitter. The first pulse energizes the receiver on the airborne interrogator and the second pulse triggers the receiver. The airborne unit measures the elapsed time between the transmission and reception of the paired pulses and converts this elapsed time into a display of distance between the aircraft and the particular ground station being interrogated.

Since the line-of-sight range of present distance measuring equipment is as high as two hundred miles, it is possible that there will be interference between ground stations which are simultaneously within the range of the aircraft. This interference problem is eliminated by utilizing variable time spacing between the paired pulses which are transmitted by the airborne interrogator. More, specifically, the airborne interrogator can selectively send out paired pulses having a different time interval therebetween. Each of the ground stations can only respond to a signal consisting of a paired set of pulses having a predetermined time interval therebetween. Thus it can be readily seen that the interrogator unit, by varying the spacing between the transmitted paired pulses, can selectively interrogate different ground stations within the range of the equipment without interference from the other ground stations. In effect, therefore, the spacing between the paired pulses serves as an identification code for selectively triggering a desired ground station which is only responsive to a pair of pulses having a predetermined spacing. It can therefore be seen that it is of great importance that the airborne D. M. E. be properly set up so that the time intervals between the various transmitted pulses coincide with the time interval required to trigger various ground stations. Furthermore it is necessary that the display of distance between the aircraft and the ground station be accurate.

The present invention discloses apparatus which is capable of simulating a D. M. E. ground station for purposes of testing, maintaining, and calibrating airbourne D. M. E. equipment. The apparatus of this invention, in response to a synchronizing pulse from the D. M. E. under test, generates a pair of pulses which may be varied in time relationship to said synchronizing pulse and to each other. These pulses are used to modulate a carrier wave produced by a signal generator, said carrier wave frequency being that to which the airborne interrogator receiver is tuned. More specifically, the apparatus of this invention can be set up to produce a pair of pulses which have a given time spacing therebetween. By observing whether the airborne D. M. E. under test is responsive to these signals it can be determined whether the spacing of the pulses transmitted from the airborne D. M. E. unit is proper. Furthermore, the actual time delay between the instant that the airborne D. M. E. is triggered and the time that the signal is received from the test equipment can be varied for the purpose of calibrating the distance measuring portion of the airborne D. M. E. under test. That is, a known time delay can be interposed between the time that the signal is sent from the airborne D. M. E. interrogator and the time that the response is obtained from the test equipment. If the distance indication given by the airborne D. M. E . corresponds to the above mentioned time delay, then the airborne D. M. E. is in proper calibration. The specific equipment for performing the aforedescribed functions will be described in detail hereafter.

It is one object of this invention to disclose an apparatus for generating a pair of pulses which are variable in amplitude, width, spacing and in time of occurrence from a trigger pulse.

It is another object of this invention to disclose test apparatus for calibrating airborne D. M. E. interrogator units without requiring the presence of a ground station.

Other objects and many of the attendant advantages of this invention will be readily appreciated as the same becomes better understood by reference to the following detailed description when considered in connection with the accompanying drawings wherein:

Fig. 1 is a block diagram which discloses how the variable delay twin pulse generator of this invention is associated with the airborne D. M. E. under test and an R.-F. generator which operates at the frequency of a D. M. E. ground station.

Fig. 2 is a block diagram showing the components of the variable delay twin pulse generator shown in Fig. 1.

Fig. 3 is a circuit diagram of the variable delay twin pulse generator shown in Fig. 2.

Fig. 4 is a diagram which depicts the waveforms produced by the variable delay twin pulse generator, shown in Figs. 2 and 3, against a time base.

Reference is now made to Fig. 1 of the drawings for an explanation of the overall relationship of the equipment when used in testing an airborne D. M. E. interrogator unit. Numeral 10 depicts the airborne D. M. E. which is being tested. A synchronizing pulse is transmitted from the "sync out" jack of the D. M. E. 10 to the "synch in" jack of the variable delay twin pulse generator 11. This synchronizing pulse energizes variable delay twin pulse generator 11 and causes it to produce a pair of twin pulses (in a manner to be described in detail hereafter) which are transmitted from the "output" jack of the generator 11 to the "external modulation" jack of a conventional R. F. signal generator 12. The above mentioned twin pulses modulate the R. F. signal produced by the R. F. signal generator. The modulated output of the R. F. signal generator is transmitted from the "R-F out" jack of the R. F.

signal generator 12 to a proble 13. An antenna 14 for the D. M. E. 10 picks up the twin pulse modulated R. F. signal, as shown in Fig. 1, and feeds it to the D. M. E. 10 which is under test. When the frequency of the output from the R. F. generator is properly adjusted the D. M. E. 10 will lock on this signal and the equipment under test may be checked and adjusted.

The construction and operation of the variable delay twin pulse generator 11 will now be generally described, attention being directed to Fig. 2. The synchronizing pulse 15 from the D. M. E. 10 is coupled to a variable delay generator 16 which is a one shot multivibrator capable, when energized by pulse 15, of producing a square wave 17 having a trailing edge which is variable in time from its leading edge, as shown in Figs. 2 and 4. The purpose of having a variable trailing edge on the square wave 17 obtained from variable delay generator 16 is to interpose a desired predetermined time delay between the time that the variable delay twin pulse generator 11 is first triggered by the synchronizing pulse 15 and the time that the trailing edge of wave 17 is used to produce a pulse output from the variable delay twin pulse generator 11. This variable time delay is used for the purpose of simulating the distance between the airborne D. M. E. 10 on test and a hypothetical ground station; that is, since the amount of time delay which is interposed between the leading and trailing edges of wave 17 is known, and since the rate of travel of the waves which are transmitted for the D. M. E. is known, the time delay can be equated to a corresponding distance between the D. M. E. 10 and a hypothetical ground station. The positive going variable trailing edge of the square wave 17 is differentiated to produce a positive pulse which in turn simultaneously triggers a fixed delay (one shot multivibrator) 18 and a pulse spacing multivibrator 19. Multivibrator 18 generates a relatively short negative pulse 20 having a positive going trailing edge which is differentiated to produce a positive pulse 21 which is used to trigger the "first pulse generator" 22, which is in turn a one shot multivibrator which is capable of producing a pulse 26 of varying width, that is, a pulse having a variable trailing edge. The square wave 23 which is produced by the pulse spacing multivibrator 19 is of variable time duration and has a variable trailing edge which is differentiated to produce a positive pulse 24 which is used to trigger "second pulse generator" 25. Pulse generator 25 is a multivibrator which is capable of producing a pulse 27 of varying width. In this manner, two pulses 26 and 27 can be produced which have a desired time spacing between them. The desired spacing is obtained by varying the duration of pulse 23. The pulses 26 and 27 are combined in pulse mixer 28 to give wave form 29, Figs. 2 and 4, and are then amplified in amplifier 30 and passed through cathode follower 31, which is used for impedance matching, to give the resultant waveform 32. Pulse mixer 28 includes means to individually vary the amplitudes of the mixed pulses. It can thus be seen that the above apparatus is capable of producing a pair of pulses which are variable in amplitude, width, spacing, and in time of occurrence from a trigger pulse. The reasons for requiring these characteristics have been given above. It is to be noted at this point, however, the small fixed delay in fixed delay multivibrator 18 is necessary to cause the first pulse 26 to be generated after the unstable portion of the waveform produced by multivibrator 19 has occurred. Because of this fixed delay the second pulse 27 can be produced almost simultaneously with or before the first pulse if this condition is desired.

Attention is now directed to Fig. 3 which is a circuit diagram of the variable delay twin pulse generator 11 which is shown in the block diagram of Fig. 2. The synchronizing pulse is applied to the grid of triode 33 of variable delay generator 16 via coupling condenser 34, variable attenuator 35, and coupling condenser 36. Attenuator 35 has the function of allowing manual control of the amplitude of the pulse which is applied to the grid of tube 33. Variable delay generator 16 is a one shot multivibrator which consists of normally conducting triode 37 and normally nonconducting triode 33. The plates of triodes 33 and 37 are connected to B+ via load resistors 38 and 39, respectively. The cathodes of triodes 33 and 37 are connected to ground through cathode resistor 40. The plate of triode 33 is coupled to the grid of triode 37 by way of capacitor 41. Variable resistor 42 is used for adjusting the grid bias of triode 33, and resistor 43 couples the grid of triode 33 to the plate of triode 37. Variable grid bias resistor 44 couples the grid of triode 37 to the cathode thereof. In operation, triode 37 of variable delay generator (multivibrator) 16 is normally conducting and the plate of triode 33, which is non-conducting, it at a relatively high voltage level. It is to be noted at this point that the output of multivibrator 16 is taken from the plate of triode 33. When the positive pulse 15 is applied to the grid of triode 33, the multivibrator 16 shifts its condition whereby triode 33 becomes conductive and triode 37 becomes non-conductive. When triode 33 conducts, the voltage on its plate decreases and therefore the output of the multivibrator 16 is at a relatively low level. Since the voltage across capacitor 41 cannot change instantaneously, the voltage at the grid of triode 37 is at the relatively low potential of the plate of triode 33 immediately after the multivibrator has changed its condition. However, as capacitor 41 discharges, the voltage at the grid of triode 37 increases until conduction of triode 37 again starts. At this time the multivibrator 16 again shifts its condition and triode 37 becomes conductive and triode 33 becomes non-conductive. Resistor 43, which connects the plate of triode 37 to the grid of triode 33, serves the purpose of facilitating the rapid change of the condition of the multivibrator, that is, when the triode 37 starts to conduct, the negative going voltage on the plate thereof is applied to the grid of triode 33 and assists in causing it to cease conducting. In this manner the trailing edge of the pulse 17 has a more nearly vertical slope and will tend to give a sharp pulse when differentiated. The time required for the capacitor 41 to discharge depends on the magnitude of the variable resistance 44. If variable resistance 44 is relatively large, capacitor 41 will require a relatively long time to discharge and the length of pulse 17, Figs. 3 and 4, will be relatively long. However, on the other hand, if a relatively low value is set into variable resistor 44, the discharge time of capacitor 41 is relatively short and the length of pulse 17 will be relatively short. As stated above, the length of pulse 17 which is produced by variable delay generator 16 simulates the distance between an airborne D. M. E. and a ground station.

The square wave output 17, Figs. 2 and 4, is simultaneously transmitted to differentiators 45 and 46. The former consists of capacitor 47 and resistor 48, and the latter consists of capacitor 49 and resistor 50. The positive going trailing edge of square wave 17, when differentiated by differentiators 45 and 46, gives positive pulses (not shown) which are fed simultaneously to fixed delay multivibrator 18 and pulse spacing multivibrator 19.

Fixed delay multivibrator has the function of producing square wave 20 which has a fixed time duration, that is, the trailing edge thereof always occurs a fixed time after the leading edge thereof. As stated above, this fixed delay is necessary to cause the first pulse 26, which is generated in response to the differentiation of the trailing edge of pulse 20, to occur after the unstable portion of waveform 20 has passed. Fixed delay multivibrator is similar in structure to variable delay generator (multivibrator) 16, and operates in the same manner as was described above with respect to multivibrator 16. The positive pulse produced by differentiation is applied to the grid of triode 51, as shown in Fig. 3, to trigger the fixed delay multivibrator 18. Structurally, fixed delay multivibrator 18 consists of triodes 51 and 52 which have their plates coupled through load resistors 53 and 54, respectively, to B+, and their cathodes through cathode resistor 55 to ground. The output of multivibrator 18 is taken from the plate of triode 51. Capacitor 56 couples the plate of triode 51 to the grid of triode 52, and grid bias resistor 57 is coupled between the cathode of triode 52 and the grid thereof. Resistor 110 couples the plate of triode 52 to the grid of triode 51. This coupling serves the same function as described in conjunction with resistor 43. It will be noted at this point that resistor 57 is of fixed magnitude as compared with the variable magnitude of resistor 44 of multivibrator 16. The reason for this is that a fixed delay output only is desired from fixed delay multivibrator 18.

The positive going trailing edge of square wave 17 is also differentiated by differentiator 46, noted above, and the positive pulse thus produced is applied to the grid of the normally non-conducting triode 58 of pulse spacing multivibrator 19, which operates in the same manner as multivibrator 16 described above. Structurally, pulse spacing multivibrator 19 consists of triodes 58 and 59 which are coupled through load resistors 60 and 61, respectively, to B+. The cathodes of these triodes are coupled through cathode resistor 62 to ground. The output of pulse spacing multivibrator 19 is taken from the plate of triode 58. Capacitor 63 couples the plate of triode 58 to the grid of triode 59. Variable resistor 64 couples the grid of triode 59 to the cathode thereof and to cathode resistor 62. Resistor 65 is connected in parallel across resistor 64. It can be readily seen that since resistor 64 is variable that the time of discharge of capacitor 63 can be regulated, and as a result of this, the period of the multivibrator 19 can be varied. Resistor 111 couples the plate of triode 59 to the grid of triode 58. This coupling serves the same function as described in conjunction with resistor 43.

It will be noted at this point that fixed delay multivibrator 18 and pulse spacing multivibrator 19 are energized by positive pulses simultaneously, as discussed above. It will be further noted that the trailing edge of pulse 20, Fig. 2, which is produced by multivibrator 18 occurs a fixed time after energization thereof whereas the trailing edge of pulse spacing multivibrator 19 can be caused to occur at a varying time after the energization thereof. The outputs of fixed delay multivibrator 18 and pulse spacing multivibrator 19 are differentiated by differentiators 66 and 67, respectively, to produce pulses 21 and 24, respectively, Fig. 2. From the foregoing analysis of the apparatus it can be seen that pulses 21 and 24 bear a known time relationship to each other. Structurally, differentiator 66 consists of capacitor 68 and resistor 69, and differentiator 67 consists of capacitor 70 and resistor 71.

The pulses, 21 and 24, which are produced by differentiators 66 and 67, respectively, are applied to the first pulse generator 22 and to the second pulse generator 25, respectively. These pulse generators are essentially multivibrators which are similar in structure to variable delay generator 16 which has been described in detail above and which description will not be repeated at the present time. The first and second pulse generators are capable of producing narrow pulses of varying width. However, since the pulses 21 and 24, which are produced by differentiation (described above), bear a definite time relationship to each other, it follows that the pulses 26 and 27 which are produced by pulse generators 22 and 25 will also bear a given time relationship to each other.

Structurally, the first pulse generator 22 is a one shot multivibrator which consists of triodes 72 and 73, the plates of which are coupled to B+ by way of load resistors 74 and 75, respectively. The cathodes of these triodes are coupled through resistor 76 to ground. Capacitor 77 couples the plate of triode 72 to the grid of triode 73. Variable grid biasing resistor 78 couples the grid of triode 73 to the cathode thereof. Resistor 79 couples the plate of triode 73 to the grid of triode 72. It can be readily seen that, according to the mode of operation explained above in conjunction with multivibrator 16, the varying of the value of resistor 78 will vary the width of the output pulse 26, Fig. 2, of the first pulse generator. The width of the pulse 26 is varied to give it the proper shape which is required.

The second pulse generator 25 is structurally similar to the first pulse generator 22. It is a one shot multivibrator which consists of triodes 80 and 81 having plates which are coupled to load resistors 82 and 83, respectively, which are connected to B+. The cathodes of these triodes are connected by way of cathode resistor 84 to ground. The plate of triode 80, which is normally non-conducting is coupled to the grid of triode 81 through capacitor 85. Variable grid biasing resistor 86 couples the cathode and grid of triode 81. The plate of triode 81 is coupled to the grid of triode 80 via resistor 87. The second pulse generator operates in the same manner as described in conjunction with variable delay generator 16. It is noted that the resistance 86, which controls the period of the multivibrator, is variable to allow the adjustment of the width of the pulse 27, Fig. 2, which is produced thereby. It is further noted that the output of pulse generator 25 is taken from the plate of normally conducting triode 81 in order to obtain a positive pulse. The output from pulse generator 22, described above, is taken in the same manner.

It is noted at this point that pulse 26, which is produced by first pulse generator 22, and pulse 27, which is produced by second pulse generator 25, bear a definite time relationship to each other, Fig. 4. These pulses are applied to pulse mixer 28, Fig. 3, from which waveform 29 is produced, Figs. 2 and 4.

The output pulse 26, from first pulse generator 22 is applied to the grid of triode 88 of pulse mixer 28 through coupling condenser 89. Pulse 27, which is produced by second pulse generator 25, is applied to the grid of triode 90 of pulse mixer 28 through coupling condenser 91. Pulse mixer 28 consists of triodes 88 and 90 which have their plates coupled to B+ via load resistor 92. The cathode of triode 90 is coupled to ground via cathode resistor 93 which has capacitance 94 in parallel therewith. The cathode of triode 88 is coupled to ground via cathode resistance 95 which has capacitance 96 in parallel therewith. Capacitors 94 and 96 serve the function of maintaining the cathode bias of tubes 90 and 88, respectively, at a relatively fixed level. Variable grid biasing resistor 97 biases the grid of triode 90 to the proper operational value and variable grid biasing resistor 98 biases the grid of triode 88 to the proper operational value. Variation of grid resistors 97, 98 permits the amplitudes of the pulses combined in mixer 28 to be individually varied.

Waveform 29, Figs. 2 and 4, is produced by pulse mixer 28. This waveform is taken from the common plate junction of triodes 88 and 90 of pulse mixer 28 and is applied to the grid of amplifying triode 99 of amplifier 30 via coupling capacitor 100. Amplifier 30 is a triode which has its plate coupled to B+ through load resistor 101. The cathode of triode 99 is coupled to ground through variable cathode biasing resistor 102, and the grid of triode 99 is coupled to ground through variable grid biasing resistor 103.

The output which is taken from the plate of triode 99 is applied to the grid of triode 104 of cathode follower 31, via coupling condenser 105, Fig. 3. Grid biasing resistor 106 and cathode biasing resistor 107 couple the grid and cathode, respectively, of triode 104 to ground. The output of cathode follower 31 is taken from the cathode of triode 104 and coupled to the output of the system by way of the coupling network consisting of capacitor 108 and resistor 109. The output from cathode follower 31 is waveform 32, Figs. 2 and 4, which is an amplified and inverted replica of waveform 29 which is applied to amplifier 30.

It can be seen from the foregoing explanation and analysis of the circuit that a variable delay twin pulse generator has been disclosed which is capable of generating a pair of pulses which are variable in amplitude width, spacing, and in time of occurrence from a trigger pulse.

It is to be further noted, that the foregoing described apparatus is also capable of producing one pulse which occurs a selectively variable time after the variable delay twin pulse generator 11, Fig. 3, is energized by a trigger pulse. When the apparatus is to be used in this manner, the output of pulse spacing multivibrator 19 is coupled to ground via capacitor 113 and switch 114. By closing switch 114, the portion of generator 11 which is operatively positioned beyond pulse spacing multivibrator 19 is not energized by the output of multivibrator 19. Consequently, under the condition where switch 114 is closed, the variable delay twin pulse generator 11 will produce only one pulse which occurs at predetermined time after generator 11 is energized by a synchronizing pulse, such as pulse 15. Briefly, this pulse is produced by the successive energization of elements 16, 18, 22, 28, 30 and 31, Figs. 2 and 3, according to the mode of operation of these elements as described fully above. This type of operation is desirable when range calibration is being made of certain types of radar equipment.

Having thus described my invention I claim:

1. A variable delay twin pulse generator for generating a pair of pulses which are variable in amplitude, width, spacing, and in time of occurrence from a trigger pulse comprising first means for producing a pulse of selectively variable duration in response to said trigger pulse, second and third means coupled to said first means for producing pulses of fixed and variable periods, respectively, said second and third means being energized simultaneously at the termination of the pulse produced by said first means, fourth and fifth means coupled to said second and third means, respectively, for producing pulses of selectively variable widths, said fourth and fifth means being energized at the termination of the pulses produced by said second and third means, respectively, and mixing means having input means coupled only to said fourth and fifth means for combining the pulses produced thereby, said mixing means including means to individually vary the amplitudes of said combined pulses.

2. A pulse generator for producing a plurality of pulses which have a predetermined amplitude, width, spacing, and time of occurrence from a trigger pulse comprising first means for producing a square wave of a variable duration when energized by said trigger pulse, second means coupled to said first means for producing a pulse upon the termination of said square wave, third and fourth means coupled to said second means and adapted to be simultaneously energized by said last named pulse for producing square waves having respectively fixed and variable durations, fifth and sixth means coupled to said third and fourth means, respectively, to produce pulses upon the termination of the square waves produced by said third and fourth means respectively, seventh and eighth means coupled to said fifth and sixth means, respectively, for producing pulses of variable durations when energized by the pulses produced by said fifth and sixth means; and mixing means having signal input means coupled only to said seventh and eighth means for combining the pulses produced by said seventh and eighth means, said mixing means including means to individually vary the implitudes of said combined pulses.

3. A variable delay twin pulse generator for generating a pair of pulses which are variable in amplitude, width, spacing, and in time of occurrence from a trigger pulse comprising a first one shot multivibrator for generating a first square wave of selectively variable width in response to said trigger pulse, differentiating means coupled to said first multivibrator for producing pulses from the leading and trailing edges of said first square wave, a second one shot multivibrator coupled to said differentiating means and responsive to the pulse produced from the trailing edge of said first square wave for producing a square wave having a fixed width, a third one shot multivibrator coupled to said differentiating means and responsive the pulse produced by said differentiating means from the trailing edge of said first square wave to produce a square wave having a selectively variable width, second and third differentiating means coupled to said second and third one shot multivibrators, respectively, for producing pulses from the leading and trailing edges of the square waves produced thereby, fourth and fifth one shot multivibrators coupled to said second and third differentiating means, respectively, and responsive to the trailing edge pulses produced by said second and third differentiating means to produce pulses of controllable widths, and means having signal input means coupled only to the output of said fourth and fifth one shot multivibrators for combining the pulses produced thereby, said combining means including means to individually vary the amplitudes of said combined pulses.

4. A pulse generator for producing a plurality of pulses from a trigger pulse comprising first means energized by said trigger pulse for producing a selectively variable delayed first pulse, second means energized upon termination of said first pulse for producing a second pulse of fixed delay, third means energized upon termination of said first pulse for producing a selectively variable delayed third pulse, fourth means energized upon termination of said second pulse for producing a selectively variable width fourth pulse, fifth means energized upon termination of said third pulse for producing a selectively variable width fifth pulse, means having signal input means connected only to said fourth and fifth means and operable to combine fourth and fifth pulses said combining means including means to individually vary the amplitudes of said combined pulses.

References Cited in the file of this patent

UNITED STATES PATENTS

| | | |
|---|---|---|
| 2,426,225 | Krause | Aug. 26, 1947 |
| 2,567,846 | Jacobsen | Sept. 11, 1951 |
| 2,580,073 | Burton | Dec. 25, 1951 |
| 2,589,254 | Hoeppner | Mar. 18, 1952 |
| 2,640,187 | Hasbrook | May 26, 1953 |
| 2,660,672 | Urtel | Nov. 24, 1953 |
| 2,710,958 | Sallach | June 14, 1955 |
| 2,742,525 | Larky et al. | Apr. 17, 1956 |